United States Patent [19]

Sabonis et al.

[11] Patent Number: 4,484,702

[45] Date of Patent: Nov. 27, 1984

[54] TRACTOR FEED ASSEMBLY TENSIONING BAR

[75] Inventors: Charles J. Sabonis, Plano; Anthony W. Clark, Dallas, both of Tex.

[73] Assignee: Xerox Corporation, Stamford, Conn.

[21] Appl. No.: 478,950

[22] Filed: Mar. 25, 1983

[51] Int. Cl.[3] .......... G03B 1/30

[52] U.S. Cl. .......... 226/74; 400/616.1; 226/195

[58] Field of Search .......... 226/6, 74, 75, 171, 226/172, 195-198; 400/616.1, 616.2, 618; 271/34, 35; 242/76, 75.3; 74/813 R

[56] References Cited

U.S. PATENT DOCUMENTS

| | | | |
|---|---|---|---|
| 2,164,455 | 7/1939 | Hart | 74/813 X |
| 2,454,863 | 7/1945 | Crocker | 271/2.1 |
| 3,152,742 | 10/1964 | Wright | 226/74 |
| 3,283,982 | 1/1965 | Haskin, Jr. | 226/195 |
| 3,586,149 | 6/1971 | Miller | 400/618 |
| 3,707,215 | 12/1972 | Familant | 197/133 P |
| 3,796,390 | 3/1974 | Melead | 242/75.5 |

FOREIGN PATENT DOCUMENTS

| | | | |
|---|---|---|---|
| 2062806 | 7/1972 | Fed. Rep. of Germany | 226/74 |
| 78756 | 6/1981 | Japan | 226/195 |

*Primary Examiner*—Leonard D. Christian
*Attorney, Agent, or Firm*—Richard A. Tomlin

[57] ABSTRACT

A tractor feed assembly for an automatic printer. A manually operated tension bar is provided between the tractor feeder and the printer platen. The bar is locked in place by a spring that biases a knob attached to the bar into locking contact with a member formed on or attached to the tractor feed frame.

3 Claims, 5 Drawing Figures

TRACTOR FEED ASSEMBLY TENSIONING BAR

The present invention relates in general to paper feeding devices and, more particularly, to an improved paper feeding assembly of the type generally used to positively feed marginally punched web material past a work station.

With the increased use of computers and word processing systems in conjunction with their associated high-speed printers, there has been an increase in the use of strip-like web material for use in the printing process. The strip-like web carries a series of longitudinally spaced perforations generally along the edges of the web. These perforations in the web are for receiving similarly positioned series of moveable feed pins to effect positive feeding of the web in the direction of movement of the pins. The web is transported past a work station such as the platen of a printer.

Conventionally, the pin feeding device is a wheel or a tractor feed mechanism. The tractors include an endless belt trained in a loop over drive wheels. The belt typically has pins projecting therefrom to engage the perforations provided in the web and to drive the web along a linear path. These tractors are normally employed in pairs at opposite edges of the web to drive the web from both edges. The tractor drive wheels are normally driven through a gear drive train by a gear mounted on the platen drive shaft. In order to easily load the web material onto the tractors and platen, the distance between the tractors and the platen is shorter than is required by the web material. This provides a slack in the web material, which must be removed before the printer can operate.

The present invention is intended to provide a method for manually tensioning a web, driven by a tractor feeder, between the tractor feeder and the platen of a printer.

One means for carrying out the invention is described below in detail with reference to the drawing, which illustrates only one specific embodiment, in which.

Figure 1:
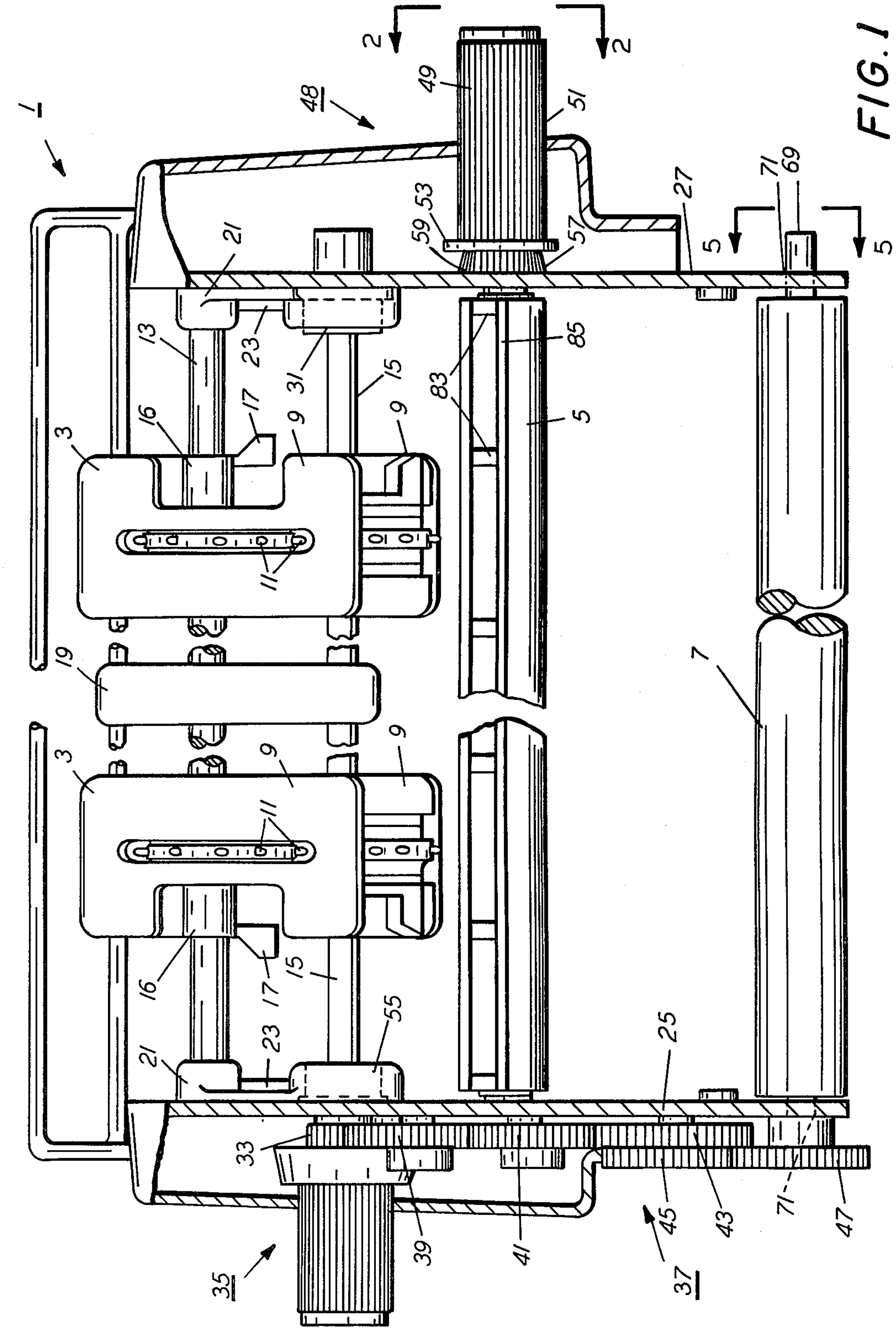
FIG. 1 is a top plan view in partial section of a web feeder embodying the present invention.

Referring now to FIG. 1, there is shown tractor feed assembly generally designated 1 which, in this exemplary instance, is made up of a pair of tractor feeders 3, a tensioning bar 5 and a printer platen 7.

Tractor feeders 3 are conventional tractor feeders described in detail in, for example, U.S. Pat. Nos. 4,130,230 and 4,194,660 to Seitz, the disclosures of which are incorporated herein by reference. These tractor feeders 3 include spring-loaded cover plates 9, which are raised to allow the loading of a web (not shown) onto the pins 11 of tractor feeder 3 such that the tractor feeder pins 11 penetrate the perforations in the web. The cover plates 9 are then closed, the springs (not shown) holding the web on tractor feeders 3. A similar pair of cover plates 9 are also present on the bottom of tractor feeders 3 to hold the web returning from platen 7 against tractor feeders 3. The tension bar 5 is then rotated as explained in detail herein to provide web tension.

Tractor feeders 3 are slideably mounted on shaft 13 and tractor feeder drive shaft 15. Shaft 15 is conventionally square; shaft 13, round in cross section. Tractor feeders 3 are driven by tractor feeder drive shaft 15 in either the forward or reverse direction with the printer platen 7. Locking release mechanisms 16 operated by tabs 17 hold the tractor feeders 3 in position on shafts 13 and 15 once tractor feeders 3 have been spaced apart a distance appropriate to accommodate the width of the web to be driven. Drive shaft 15 and shaft 13 are supported against bending by support clamp 19. Support clamp 19 is slideably mounted on shaft 13 and drive shaft 15. Drive shaft 15 is further mounted for rotation through support clamp 19. The ends of shaft 13 are held in pivoting members 21. Tractor feeders 3, shaft 13, support clamp 19 and pivoting members 21 all are mounted for pivoting around drive shaft 15 to aid in the initial loading of the web. After web loading, pivoting members 21 and the associated shaft 13, support clamp 19 and tractor feeders 3 are locked in place against sidewalls 25 and 27 by clamps 23, which clamps 23 are mounted on sidewalls 25 and 27.

Drive shaft 15 is mounted for rotation in sidewall 27 by idler bearings 31. Tractor feeder drive shaft 15 has mounted on one end a drive shaft drive gear 33 and a drive shaft clutch arrangement generally designated 35. The drive shaft clutch 35 is described in detail in copending application Ser. No. 479,042, filed Mar. 25, 1983, and entitled "Tractor Feed Assembly With Clutch". Drive shaft 15 is driven by drive shaft drive gear 33. Drive gear 33 is driven in turn by a drive train 37 made up of a series of gears 39, 41, 43 and 45. When tractor feed assembly 1 is mounted on printer platen 7, gear 45 is in driven relationship to platen gear 47. As platen 7 is turned, gear 47, drive train 37, drive gear 33, drive shaft 15 and the tractor feeders 3 are all actuated.

Figure 3:
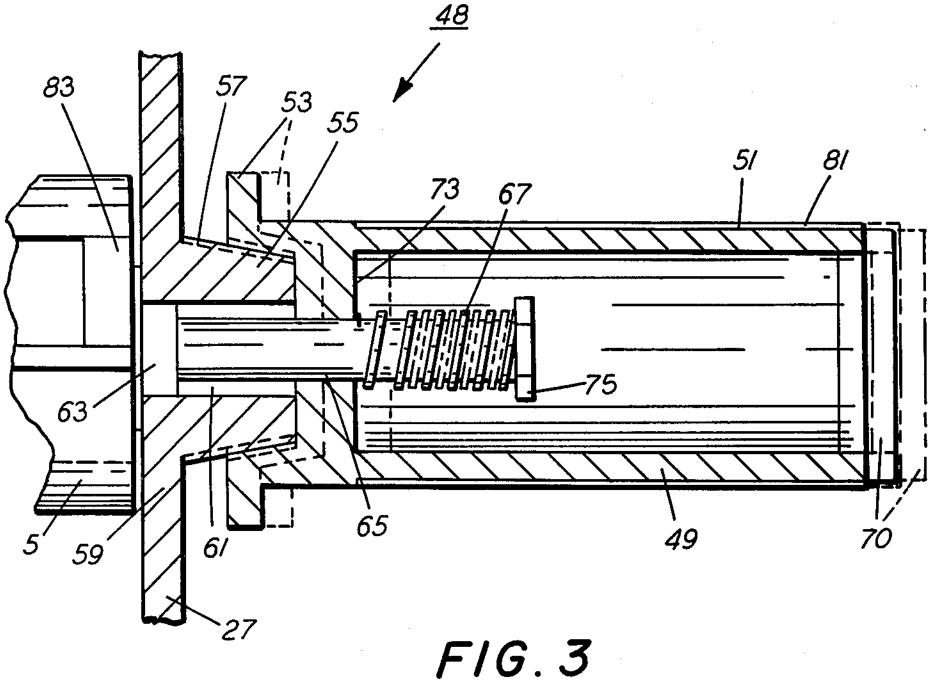
FIG. 3 is an enlarged sectional view of the tension bar manual release mechanism taken along line 3—3 in FIG. 2.
Figure 2:
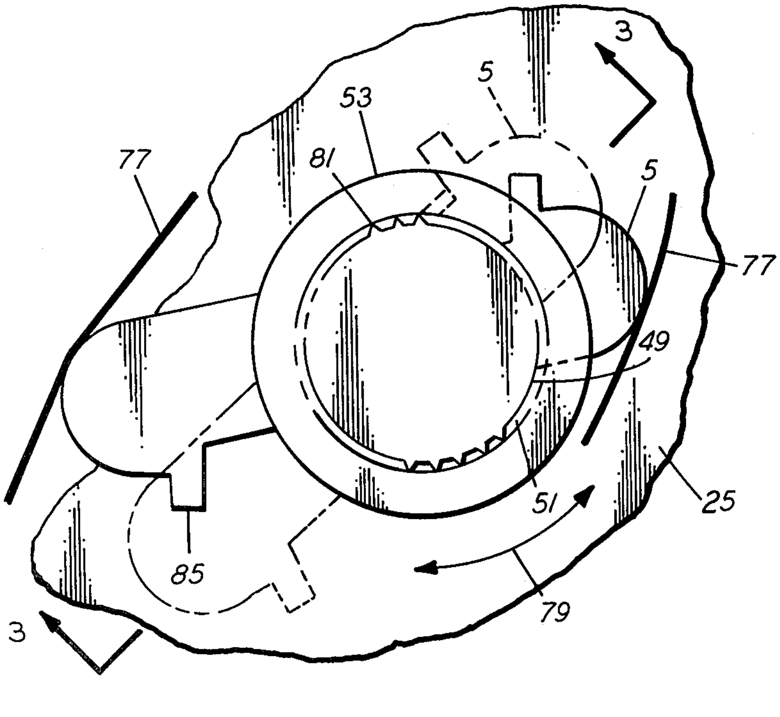
FIG. 2 is an enlarged side view along line 2—2 in FIG. 1 of the tension bar manual release mechanism with sidewall 27 deleted.

Referring now to FIGS. 2 and 3, tension bar release and control mechanism generally designated as 48 comprises hollow housing 49 and includes a knob end 51 and a teeth end 53. Tapered teeth 55 formed in gear end 53 are designed to mate with tapered teeth 57 formed in frustoconical form 59, which form 59 is molded into sidewall 27 and is an intrinsic part thereof. Frustoconical form 59 and sidewall 27 are provided with an opening 61, which provides alignment and a bearing surface for tension bar shaft mounting 63, which is mounted for rotation within aperture 61. Tension bar 5 is mounted on tension bar shaft 65 for rotation therewith. Housing 49 is similarly fixed to shaft 65 for rotation therewith. Tension bar shaft 65 is mounted for rotation in sidewall 25 as well as sidewall 27.

Housing 49 is biased against frustoconical form 59 by spring 67, which bears on interior surface 73 of housing 49. Spring 67 is held in place on tension bar shaft 65 by spring retaining washer and nut 75. Spring 67 is compressed by interior surface 73 and spring retaining washer and nut 75 such that teeth 55 on teeth end 53 of housing 49 are firmly engaged with teeth 57. Since teeth 57 are fixed, housing 49, tension bar shaft 65 and tension bar 5 cannot be rotated while teeth 55 are engaged with teeth 57. It can be seen, however, that, by pulling housing 49 away from frustoconical form 59 to the position shown in phantom lines in FIG. 2, teeth 55 are disengaged from teeth 57 allowing housing 49, tension bar shaft 65 and tension bar 5 to be rotated in the direction shown by arrows 79 to tension or release a web 77 (FIG. 2). To assist the operator in this function, knob end 51 is provided with ridges 81. Assembly of the manual tension bar release and control mechanism 48 is aided by the use of a removable friction fit end cap 70, which on removal provides access for assembling tension bar spring 67 and spring retaining washer and nut 75 on tension bar 5.

Tension bar 5 is preferably a one-piece molded plastic piece which is essentially "S" shaped in cross section and has ridges 83 (see FIG. 1) and lips 85 formed therein for stiffening the bar against bending. To tension web 77 (see FIG. 2) bar 5, the operator pulls knob 51 away from frustoconical form 57 and turns the knob until the desired tension is obtained. Releasing knob 51 allows spring 67 to move housing 49 to the left as shown in FIG. 3 reengaging teeth 55 with teeth 57 thus locking tension bar 5 in position. Reversing the procedure releases the tension for loading or unloading web 77.

Figures 4, 5:
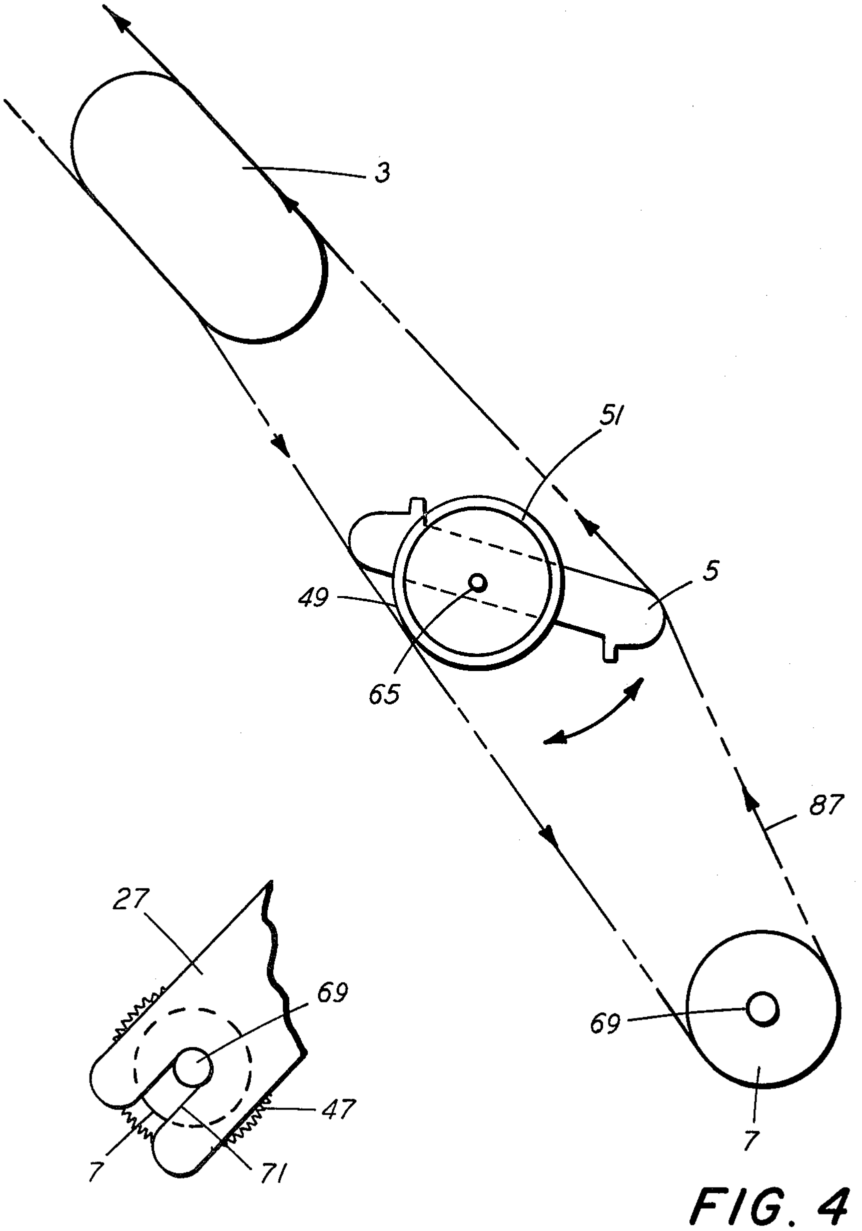
FIG. 4 is a schemtic representative side view of the web feeder and printer platen showing the paper path.
FIG. 5 is a partial side view of the web feeder to printer platen mounting taken along lines 5—5 in FIG. 1.

FIG. 4 shows schematically how the tension bar 5 of this invention interacts with printer platen 7 tractor feeder 3 and the paper path 87.

Referring to FIG. 5, tractor feed assembly 1 may have its own platen to fit in place of the printer platen. For convenience, however, the tractor feed assembly may be designed to mount on the existing printer platen drive shaft 69. Sidewalls 25 and 27 are provided with U-shaped openings 71, which fit onto the printer platen drive shaft 69. The remainder of the tractor feed assembly 1 rests on the top of the printer (not shown).

Although the present invention has been described with reference to a presently preferred embodiment, it will be appreciated by those in the art that various modifications, alternatives, variations, etc., may be made without departing from the spirit and scope of the invention as defined in the appended claims.

What is claimed is:

1. A tension bar mechanism for tensioning and releasing a web between a pin feeding device and a printer platen which comprises a tension bar mounted coaxially on a shaft for rotation therewith, said shaft being mounted at each end for axial rotation in first and second supporting sidewalls, an end of said shaft having a projecting portion projecting through said first supporting sidewall and having biasing means secured to said projecting portion; a knob positioned on said projecting portion of said shaft and containing an inner surface for contacting said biasing means such that said biasing means biases said knob toward said first supporting sidewall, said knob having at least one locking means thereon facing said first supporting sidewall, said first supporting sidewall having on a surface facing said knob a means for mating with and retaining said locking means on said knob; said biasing means being of sufficient strength to prevent rotation of said shaft when said knob locking means is in contact with said retaining means and for rotating said shaft with said knob when said knob locking means is out of contact with said retaining means and said knob is rotated.

2. The tension bar mechanism of claim 1 wherein said retaining means is frustoconical.

3. The tension bar mechanism of claim 1 wherein said bar has a first contact edge and a second contact edge for contacting the web positioned such that one edge of said bar is in contact with the web prior to the web's contact with the printer platen, and said second edge of said bar is in contact with the web subsequent to the web's contact with the printer platen.

* * * * *